US011745444B2

(12) United States Patent
Shakour et al.

(10) Patent No.: US 11,745,444 B2
(45) Date of Patent: Sep. 5, 2023

(54) SIMULTANEOUS OPTIMIZATION OF FIBER SIZING IN-LINE WITH THE PULTRUSION PROCESS

(71) Applicant: BASF SE, Ludwigshafen am Rhein (DE)

(72) Inventors: Elias Ruda Shakour, Wyandotte, MI (US); Syed Ashraf, Wyandotte, MI (US); Matthew Gerard Lyon, Wyandotte, MI (US); Joseph P. Borst, Wyandotte, MI (US); Robert Lyons, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 422 days.

(21) Appl. No.: 16/964,895

(22) PCT Filed: Jan. 29, 2019

(86) PCT No.: PCT/EP2019/052051
§ 371 (c)(1),
(2) Date: Jul. 24, 2020

(87) PCT Pub. No.: WO2019/149672
PCT Pub. Date: Aug. 8, 2019

(65) Prior Publication Data
US 2021/0031468 A1 Feb. 4, 2021

Related U.S. Application Data

(60) Provisional application No. 62/625,441, filed on Feb. 2, 2018.

(30) Foreign Application Priority Data

Apr. 19, 2018 (EP) .................... 18168143

(51) Int. Cl.
*C08K 7/14* (2006.01)
*B29C 70/52* (2006.01)
*C08J 5/06* (2006.01)
*C08K 9/04* (2006.01)
*B29K 75/00* (2006.01)

(52) U.S. Cl.
CPC ............... *B29C 70/521* (2013.01); *C08J 5/06* (2013.01); *C08K 7/14* (2013.01); *C08K 9/04* (2013.01); *B29K 2075/00* (2013.01); *C08J 2375/08* (2013.01)

(58) Field of Classification Search
CPC ....... B29C 70/521; B29C 70/52; B29C 70/06; C08J 5/06; C08J 5/24; C08K 7/14; C08K 9/04; B29K 2105/0872; B29K 2075/00; B29B 15/12; C03C 25/34
USPC ........................................................ 523/206
See application file for complete search history.

(56) References Cited

U.S. PATENT DOCUMENTS

| | | | |
|---|---|---|---|
| 5,294,461 A | 3/1994 | Ishida | |
| 5,824,413 A | 10/1998 | Schell | |
| 9,574,056 B2 | 2/2017 | Zhang et al. | |
| 2004/0094859 A1* | 5/2004 | Cheolas | C08G 18/4841 524/217 |
| 2004/0106726 A1* | 6/2004 | Joshi | C08G 18/6696 524/589 |
| 2005/0127551 A1* | 6/2005 | Uhm | D04H 1/4218 264/109 |
| 2009/0023870 A1 | 1/2009 | Berksoy et al. | |
| 2011/0045275 A1 | 2/2011 | Tadepalli et al. | |
| 2014/0004308 A1* | 1/2014 | Taniguchi | C08J 5/04 428/156 |
| 2015/0376398 A1* | 12/2015 | Guha | C08K 7/14 523/427 |
| 2016/0108188 A1 | 4/2016 | Zhang et al. | |
| 2016/0108189 A1* | 4/2016 | Zhang | C08J 5/06 523/217 |
| 2016/0177046 A1* | 6/2016 | Torres | C08J 9/0066 521/122 |

OTHER PUBLICATIONS

European Search Report for EP Patent Application No. 18168143.8, dated Oct. 24, 2018, 3 pages.
International Search Report and Written Opinion for corresponding PCT/EP2019/052051 dated Sep. 11, 2019, 10 pages.

* cited by examiner

*Primary Examiner* — Hannah J Pak
(74) *Attorney, Agent, or Firm* — Armstrong Teasdale LLP

(57) ABSTRACT

The present disclosure relates to a pultrusion process for preparing a reinforced thermoset polyurethane composite, and specifically relates to a pultrusion process for simultaneous optimization of fiber sizing continuously along with the pultrusion process without any interruption by contacting the fibers with a sizing composition.

28 Claims, No Drawings

US 11,745,444 B2

SIMULTANEOUS OPTIMIZATION OF FIBER SIZING IN-LINE WITH THE PULTRUSION PROCESS

CROSS-REFERENCE TO RELATED APPLICATIONS

This application is a U.S. National Phase Application of PCT/EP2019/052051, filed on Jan. 29, 2019, which claims the benefit of priority to European Patent Application Number 18168143.8, filed on Apr. 19, 2018, and U.S. Provisional Patent Application No. 62/625,441, filed on Feb. 2, 2018, the entire contents of which are hereby incorporated by reference herein.

TECHNICAL FIELD

The present subject matter relates to a pultrusion process for preparing a reinforced thermoset polyurethane composite. The present subject matter particularly relates to a pultrusion process for simultaneous optimization of fiber sizing in-line with the pultrusion process.

BACKGROUND

In recent years, the use of pultrusion process to form a composite structure has become increasingly popular since it enables such structures to be fabricated on a continuous basis. Also, reinforced composites are growing in popularity for applications as automobile components, boat hulls and fishing rods. Reinforced polymeric composites are formed from a polymeric matrix material, reinforcing material, or any other desired components in a variety of ways. Generally, resins are combined with fibers, particles, and other solids to make reinforced composites. Methods for making fiber reinforced composites are well-known, which includes the pultrusion process. Conventionally, the fibers in such methods are sized by the fiber manufacturers which limits the chemistry of specific applications. The re-sizing of the fibers is done to effectively alter the surface treatment in a manner that makes them better suited to the end properties of the composite material. In such case the resized fiber is treated as a new and unique raw material feedstock for the composite manufacturing process and must be handled and stored as a new part number. And this necessitates high cost for inventory and part managements of the resized fibers.

In the state of the art, pultrusion process for preparing fiber reinforced composites are known and described, for instance, in the following references.

U.S. Pat. No. 9,574,056 B2 describes a method for making a fiber-reinforced thermoplastic polyurethane composite by applying a sizing composition to a plurality of fibers to make sized fibers, wherein the sizing composition comprises at least one curative for a thermoplastic polyurethane composite. The method uses a pre-polymer and a resin as a curative for sizing.

U.S. Pat. No. 5,294,461 describes a pultrusion process for preparing a fiber rein-forced polymer composite comprising combining polymer precursors in a mixer and continuously introducing the resulting mixture into an impregnation chamber and subsequently passing it through a die in which polymerization takes place to form desired composite.

U.S. 2011/0045275 A1 describes a method for making fiber reinforced composite article by treating fibers with a sizing composition that includes a polymerization compound and an initiator compound and subsequently introducing the treated fibers to a pre-polymerized composition.

However, in all these methods fiber resizing is done separately to meet the required end properties of the composite material. Further, the fiber and matrix interaction in the composite materials in the prior arts show that the certain mechanical properties are directly affected by the interface with almost little or no opportunity to control or optimize the interaction. Additionally, the drawback of these methods is that the separate resizing of fibers limits chemistry application of these fibers and incurs high capital costs for inventory and maintenance. Further, a large creel is generally required in such cases and there is a need to place source fibers of different surface treatment into specific physical locations, which is a potential source for operator error and could greatly effect performance of the final reinforced polyurethane composite. Furthermore, there can be contamination of the fibers due to sources such as humidity, dust or other foreign agents which could take place in storage or even while mounted on the creel. Therefore, there is a need for an improved pultrusion method for preparing a reinforced thermoset polyurethane composite with optimized method for fiber sizing.

SUMMARY

The object of the present subject matter is to provide an improved pultrusion process for preparing a reinforced thermoset polyurethane composite and simultaneous optimization of fiber sizing continuously along the pultrusion process.

Another object of the present subject matter is to provide a re-sizing intermediate process that can be systematically coupled simultaneously with compo-site manufacturing process, particularly pultrusion process.

A further object of the present subject matter is to provide a pultrusion process for optimizing parameters like loading concentration of sized fibers, loading concentration of re-sizing agent, drying temperature to tailor application specific properties like improved energy absorption, large deflection or higher strength.

An additional object of the present subject matter is to provide an improved pultrusion process for high percentage sizing by introducing one or more re-sizing agents or sizing agents intended to modify the surface properties of the fibers, wherein the sizing agent according to the present subject matter is highly compatible with the pultrusion process and promotes an improved interface and compatibility between the fibers and the matrix.

Accordingly, in a first aspect of the present subject matter, a pultrusion process for preparing a reinforced thermoset polyurethane composite, the process comprising the steps of:

a) contacting a plurality of reinforcing fibers with a sizing composition comprising at least one sizing agent selected from at least one polyimine having a weight average molecular weight in the range of ≥800 g/mol to ≤1,000,000 g/mol determined according to gel permeation chromatography, to obtain a plurality of sized reinforcing fibers; and b) coating the plurality of sized reinforcing fibers obtained in step (a) with a precursor mixture comprising (i) at least one di- or polyisocyanate and (ii) at least one polyol to obtain a plurality of coated sized reinforcing fibers; and c) passing the plurality of coated sized reinforcing fibers obtained in step (b) through at least one die and at least one heating zone to obtain the rein-forced thermoset polyurethane composite.

In an embodiment of the present subject matter, the plurality of rein-forcing fibers is selected from the group consisting of glass fibers, ceramic fibers, metal fibers, carbon fibers, natural fibers, polyester fibers, polyaramid fibers, basalt fibers and nylon fibers.

In another embodiment of the present subject matter, the sizing com-position further comprises surfactants, solvents, film-forming agents, lubricants and wetting agents.

In a yet another embodiment of the present subject matter, the steps a) contacting a plurality of reinforcing fibers with a sizing composition comprising at least one sizing agent selected from at least one polyimine having a weight average molecular weight in the range of ≥800 g/mol to ≤1,000,000 g/mol determined according to gel permeation chromatography, to obtain a plurality of sized reinforcing fibers; and b) coating the plurality of sized reinforcing fibers obtained in step (a) with a precursor mixture comprising (i) at least one di- or polyisocyanate and (ii) at least one polyol to obtain a plurality of coated sized reinforcing fibers; and c) passing the plurality of coated sized reinforcing fibers obtained in step (b) through at least one die and at least one heating zone to obtain the reinforced thermoset polyurethane composite are performed uninterrupted continuously.

In another embodiment of the present subject matter, the sizing composition comprises ≥1 wt. % to ≤99 wt. % of the at least one sizing agent and ≥0.1 wt. % to ≤5 wt. % of at least of surfactant.

In a further embodiment of the present subject matter, the polyimine having a weight average molecular weight in the range of ≥800 g/mol to ≤1,000,000 g/mol determined according to gel permeation chromatography, is a polyalkylene imine.

In another embodiment of the present subject matter, the polyalkylene imine having a weight average molecular weight in the range of ≥800 g/mol to ≤1,000,000 g/mol determined according to gel permeation chromatography, is selected from the group consisting of polyethylene imine and modified polyethylene imine.

In a further embodiment of the present subject matter, the at least one surfactant is selected from the group consisting of block copolymers based on ethylene oxide and propylene oxide, stearic ethanolamide, polyethylene glycol esters, ethoxylated castor oil esters, aliphatic monoamines, aromatic diamines, amine ethoxylates and cationic fatty amides.

In a yet another embodiment of the present subject matter, the block copolymer based on ethylene oxide and propylene oxide is selected from the group consisting of ethylenediamine polyoxyethylene-polyoxypropylene block copolymer and ethoxylated alcohol.

In another embodiment of the present subject matter, the plurality of rein-forcing fibers is contacted with 0.01 wt. % to 50 wt. % of the sizing composition, based on the total weight of the plurality of sized reinforcing fibers.

In a further embodiment of the present subject matter, the pultrusion process further comprises the step of drying of the plurality of sized reinforcing fibers by heating the plurality of sized reinforcing fibers obtained in step (a) at a temperature in the range of ≥35° C. to 200° C.

In another embodiment of the present subject matter, the precursor mixture further comprises (iii) at least one catalyst, and (iv) at least one additive.

In another embodiment of the present subject matter, the precursor mixture further comprises (iii) at least one catalyst, (iv) at least one additive and (v) at least one chain extender.

In a yet another embodiment of the present subject matter, the thermoset polyurethane composite is the reaction product of the at least one polyol and the at least one di- or polyisocyanate.

In a preferred embodiment of the present subject matter, the at least one polyol is selected from the group consisting of polyether polyols and polyester polyols.

In another embodiment of the present subject matter, the polyether polyol has a functionality in the range of ≥2 to ≤4.

In a further embodiment of the present subject matter, the polyether polyol has a hydroxyl number in the range of ≥30 mg KOH/g to ≤900 mg KOH/g.

In a yet another embodiment of the present subject matter, the polyether polyol is a mixture of a first polyether polyol having a functionality of 2 and a hydroxyl number in the range of 30 mg KOH/g to 100 mg KOH/g and a second polyether polyol having a functionality of 3 and a hydroxyl number in the range of ≥200 mg KOH/g to ≤450 mg KOH/g.

In another embodiment of the present subject matter, the polyester polyol has a functionality in the range of ≥2 to ≤4.

In a further embodiment of the present subject matter, the polyester polyol has a hydroxyl number in the range of ≥30 mg KOH/g to ≤2000 mg KOH/g.

In a yet another embodiment of the present subject matter, the precursor mixture comprises
(i) ≥37 wt. % to ≤60 wt. % of the at least one di- or polyisocyanate,
(ii) ≥10 wt. % to ≤30 wt. % of the at least one polyol, x'
(iii) ≥0.1 wt. % to ≤1 wt. % of the at least one catalyst,
(iv) ≥1 wt. % to ≤9 wt. % of the at least one additive, and
based on the total weight of the precursor mixture.

In another embodiment of the present subject matter, the at least one di- or polyisocyanate component is selected from the group consisting of an aromatic diisocyanate, a carbodiimide modified aromatic diisocyanate, a carbodiimide modified polyisocyanate, a urethane-modified polyisocyanate, an isocyanurate-modified polyisocyanate, a urea-modified polyisocyanate, a biuret-containing polyisocyanate, and an isocyanate-terminated prepolymer.

In a yet another embodiment of the present subject matter, the at least one additive is selected from the group consisting of internal mold release agents, flame retardants, smoke suppressants, fillers, dyes, pigments, antistatic agents, antioxidants, water scavengers, antifoaming agents and UV stabilizers.

In a further embodiment of the present subject matter, the at least one catalyst is selected from the group consisting of stannous salts of organic carboxylic acids, dialkyltin (IV) salts of carboxylic acids, phenylmercury neodecanoate, bismuth carboxylates, and tertiary amines.

In another embodiment of the present subject matter, the sized reinforcing fibers in the pultrusion process are coated in combination with a plane reinforcing fiber.

In a yet another embodiment of the present subject matter, the sized rein-forcing fibers are used in combination with the plane reinforcing fiber in a weight ratio of ≥35 to ≤80.

In a further embodiment of the present subject matter, the at least one sizing agent is reacted with the precursor mixture at the surface of the plurality of sized reinforcing fibers.

In another embodiment of the present subject matter, the at least one heating zone through which plurality of coated sized reinforcing fibers in the pultrusion process are passed through comprises heating zones (Z1), (Z2) and (Z3).

In a preferred embodiment of the present subject matter, the heating zone (Z1) has a temperature in the range of ≥135° C. to ≤180° C., the heating zone (Z2) has a temperature in the range of ≥150° C. to ≤180° C. and the heating zone (Z3) has a temperature in the range of ≥180° C. to ≤210° C.

It is an advantage of the pultrusion process of the present subject matter to enable fiber resizing continuously during the preparation of reinforced thermoset polyurethane composite. The specific sizing agent of the present subject matter have been developed to interact with the reinforcing fibers and the matrix in a tailored manner intended to improve the properties of the reinforced thermoset polyurethane composite. Thus, the pultrusion process of the present subject matter provides an added advantage of improved mechanical properties of the reinforced thermoset polyurethane composite prepared using the process. Generally, the rein-forced thermoset polyurethane composite prepared by the process according to the present subject matter is not particularly limited. Other objects, advantages and applications of the present subject matter will become apparent to those skilled in the art from the following detailed description and appended claims.

DETAILED DESCRIPTION

The following detailed description is merely exemplary in nature and is not intended to limit the present subject matter or the application and uses of the present subject matter. Furthermore, there is no intention to be bound by any theory presented in the preceding technical field, background, summary or the following detailed description.

The present subject matter relates to a pultrusion process for preparing a reinforced thermoset polyurethane composite. Generally, the pultrusion process can be used for producing fiber-reinforced profiles with constant cross section. A pultrusion plant is typically composed of an impregnation unit, a heated die, and a take-off system, which is responsible for the continuity of the process. The impregnation of the fibers takes place in an open bath or in a closed injection box. Here, the reinforcement material, for example the fiber, is wetted with a resin. The composite is then shaped and hardened in the heated die. A take-off system draws the finished profile out of the die, and it is finally cut to the desired lengths.

The pultrusion process (P) according to the present subject matter for preparing the reinforced thermoset polyurethane composite comprises the following steps and optionally additional steps as described below.

The pultrusion process (P) comprises continuous pulling a roving or tow of a plurality of continuous reinforcing fibers through a sizing chamber. The plurality of reinforcing fibers is spread through high tension pullers before sizing to obtain high percentage sizing. The pulling speed of the plurality of continuous reinforcing fibers is in the range ≥0.3 meter/min to ≤3 meter/min.

In an embodiment of the present subject matter, the pultrusion process (P) comprises contacting the plurality of reinforcing fibers with a sizing composition comprising at least one sizing agent selected from at least one polyimine having a weight average molecular weight in the range of ≥800 g/mol to ≤1,000,000 g/mol determined according to gel permeation chromatography, to obtain a plurality of sized reinforcing fibers. The plurality of reinforcing fibers is coated with the polyimine and are passed to an impregnation chamber. The polyimine applied to the reinforcing fibers in an intermediate process step effectively alters the surface treatment in a manner that makes the fibers better suited to the end properties of the final composite material. The polyimine can be applied to all the fibers or to only those intended to be placed in specific parts of the composite material. The intermediate process step can be introduced as an in-line step or in other words carried out uninterrupted continuously in the composite preparation pultrusion process. The term "in-line" used herein in the present subject matter means performing the sizing of the fibers uninterrupted continuously in the composite preparation pultrusion process.

The plurality of sized reinforcing fibers obtained are contacted with a precursor mixture comprising (i) at least one di- or polyisocyanate and (ii) at least one polyol to obtain a plurality of coated sized reinforcing fibers in the impregnation chamber. The plurality of sized reinforcing fibers are reacted with the precursor mixture at the surface of the plurality of sized reinforcing fibers. The complete wetting of the fibers by the precursor mixture takes place in the impregnation chamber. The di- or polyisocyanate and the polyol in the precursor mixture polymerize into a polyurethane. The polyimine added becomes a part of the matrix and is located at the sur-face of the reinforcing fiber. The polyimine at the surface of the reinforcing fiber acts as a barrier in two possible ways. The polyimine can react with the polyurethane, to terminate the polymerization reaction at that outer layer of the reinforcing fiber in one way. In another way, the polyimine acts as barrier by interfering with the polyurethane and reacts with the compatible sizing of the fibers.

The sized reinforcing fibers are passed through a drying chamber and heated at a temperature in the range of ≥35° C. to ≤200° C. to obtain dried sized rein-forcing fibers. The dried sized reinforcing fibers and the precursor mixture are subsequently passed through the impregnation chamber where the coating of the sized reinforcing fibers with the precursor mixture is performed. The conditions in the impregnation chamber are such that substantially no polymerization can take place.

The plurality of reinforcing fibers is selected from fibers that have a diameter ≥5.0 microns to ≤30.0 microns and can be cut into segments having a discrete length of ≥5.0 mm to ≤50.0 mm in length. Preferably, the plurality of reinforcing fibers have a diameter from ≥10.0 microns to ≤20.0 microns and a length from ≥20 mm to ≤35 mm.

The plurality of reinforcing fibers is contacted with ≥0.01 wt. % to ≤50 wt. % of the sizing composition, based on the total weight of the plurality of sized reinforcing fibers. The sizing composition comprises at least one sizing agent selected from at least one polyimine. The polyimine is selected from the group consisting of a weight average molecular weight in the range of ≥800 g/mol to ≤1,000,000 g/mol determined according to gel permeation chromatography. The polyimine is preferably selected from the group consisting of a weight average molecular weight in the range of ≥800 to ≤900,000 g/mol determined according to gel permeation chromatography. The polyimine is more preferably selected from the group consisting of a weight average molecular weight in the range of ≥800 g/mol to ≤750,000 g/mol determined according to gel permeation chromatography. The polyimine is most preferably selected from the group consisting of a weight average molecular weight in the range of ≥800 g/mol to ≤250,000 g/mol determined according to gel permeation chromatography. The polyimine is preferably a polyalkylene imine.

The polyimine, in particular the polyalkylene imine, may be linear or branched. The polyalkylene imine is preferably a linear or branched poly(C2-C4-alkyleneimine), more preferably a linear or branched polypropylene imine, a linear or branched poly(ethylene imine-co-propylene imine) or a linear or branched poly-ethylene imine or a mixture thereof. Even more preferably, the polyalkylene imine is a linear or branched polyethylene imine.

The sizing composition can be contacted with the plurality of reinforcing fibers by suitable conventional methods. For example, the sizing composition can be contacted with the plurality of reinforcing fibers with different static or dynamic applicators including belt applicator, spraying, dipping or any other suitable means. After the sizing of the plurality of fibers, the fibers can be wound into roving pack-ages, dried or can be chopped to form chopped fiber strands.

The polyalkylene imine is selected from the group consisting of polyethylene imine and modified polyethylene imine. The modified polyethylene imine has been modified by carboxyalkoylation, alkoxylation, amidation, or modifying with a polymer backbone to make it hydrophobic, hydrophilic, amphiphilic or amphoteric.

The sizing compositions provide protection for subsequent processing steps, such as those where the fibres pass by contact points as in the winding of the fibres and strands onto a forming package, drying the sized fibres to remove the water and/or other solvent or melting of the film former on the fibre surface, twisting from one package to a bobbin, beaming to place the yarn onto very large packages ordinarily used as the warp in a fabric, chopping in a wet or dry condition, roving into larger bundles or groups of strands, unwinding, and other downstream processes. In addition, the sizing composition can play a dual role when placed on fibres that reinforce polymeric matrices in the production of fibre-reinforced plastics. In such applications, the sizing composition can provide protection as well as compatibility and/or chemical bonding between the fibre and the matrix polymer. Conventional sizing compositions typically contain one or more film forming polymeric or resinous components, and one or more lubricants dissolved or dispersed in a liquid medium. The film forming component of the sizing composition is desirably selected to be compatible with the matrix resin or resins in which the fibres are to be embedded.

The plurality of reinforcing fibers is selected from the group consisting of glass fiber, ceramic fibers, metal fibers, carbon nanotube, carbon fiber, polyester fiber, natural fiber, aramid fiber, polyester fibers, polyaramid fibers, nylon fiber, bas-alt fiber, boron fiber, silicon carbide fiber, asbestos fiber, whisker, hard particle, met-al fiber, or a combination of any thereof. The plurality of reinforcing fibers is preferably selected from the group consisting of glass fibers, ceramic fibers, metal fibers, carbon fibers, natural fibers, polyester fibers, polyaramid fibers, basalt fibers and nylon fibers. The plurality of reinforcing fibers is more preferably selected from the group consisting of glass fibers and carbon fibers. The fiber is selected from all forms of fibers including fiber mats, continuous fibers and pultruded rods. The fibers can be arranged as a mon-axial and/or multiaxial, woven and/or non-woven, continuous and/or chopped strand mat or combinations thereof. The mat can have multiple sections with different weave styles, as well as combinations of woven and non-woven sections. In addition, the mats can have regions where fibers are incorporated, for examples to allow better wet out and sizing agent penetration in a preselected part or parts of the composite.

The precursor mixture comprises (i) at least one di- or polyisocyanate and (ii) at least one polyol. The precursor mixture further comprises (iii) at least one catalyst, and (iv) at least one additive. The thermoset polyurethane composite is the re-action product of the at least one polyol and at least one di- or polyisocyanate. In an embodiment, the thermoset polyurethane composite is the reaction product of polyisocyanate component and a isocyanate reactive component only. The polyisocyanate component and the isocyanate reactive component can be premixed with any optional additives.

Regarding the di- or polyisocyanate component, suitable di- and polyisocyanates are known to those skilled in the art and include unmodified isocyanates, modified polyisocyanates, and isocyanate prepolymers. Such organic polyisocyanates include aliphatic, cycloaliphatic, aralphatic, aromatic, and heterocyclic polyisocyanates of the type described, for example, by W. Siefken in Justus Liebigs Annalen der Chemie, 562, pages 75 to 136.

Examples of such isocyanates include those represented by the formula, Q(NCO)n, in which n is a number from 2-5, preferably 2-3, and Q is an aliphatic hydrocarbon group containing 2-18, preferably 6-10, carbon atoms; a cycloaliphatic hydrocarbon group containing 4-15, preferably 5-10, carbon atoms; an araliphatic hydrocarbon group containing 8-15, preferably 8-13, carbon atoms; or an aromatic hydrocarbon group containing 6-15, preferably 6-13, carbon atoms.

Examples of suitable di- and polyisocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane (isophorone diisocyanate; e.g. German Auslegeschrift 1,202,785 and U.S. Pat. No. 3,401,190); 2,4- and 2,6-hexahydrotoluene diisocyanate and mixtures of these isomers; dicyclohexylme-thane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI), which are described, for example, in GB 878,430 and GB 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for ex-ample, in U.S. Pat. Nos. 3,394,164 and 3,644,457; modified polyisocyanates containing allophanate groups of the type described, for example, in GB 994,890, BE 761,616, and NL 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in GB 889,050; polyisocyanates obtained by telomerization reactions of the type described, for ex-ample, in U.S. Pat. No. 3,654,106; polyisocyanates containing ester groups of the type described, for example, in GB 965,474 and GB 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. Those skilled in the art will recognize that it is also possible to use mixtures of the polyisocyanates described above.

Isocyanate-terminated prepolymers may also be employed in the present invention. Prepolymers may be prepared by reacting an excess of organic polyisocyanate or mixtures thereof with a minor amount of an active hydrogen-containing compound as determined by the well-known Zerewitinoff test, as described by Kohler in "Journal of the American Chemical Society," 49, 3181(1927). These compounds and their methods of preparation are well known to those skilled in the art. The use of any one specific active hydrogen compound is not critical; any such compound can be employed in the practice of the present invention.

The di- or polyisocyanate component preferably contains organic polyisocyanates having a number averaged isocyanate (NCO) functionality of $\geq 1.8$ to $\leq 4.0$, more preferably $\geq 2.0$ to $\leq 3.0$, most preferably $\geq 2.3$ to $\leq 2.9$. The NCO functionality of the polyisocyanate composition may be in an amount ranging between any combination of these values, inclusive of the recited values. The polyisocyanate component preferably has a free isocyanate group content (NCO content) in the range of $\geq 5\%$ to $\leq 50\%$ by weight, more preferably from $\geq 8\%$ to $\leq 40\%$, most preferably from $\geq 9\%$ to $\leq 35\%$ by weight. The NCO content of the polyisocyanate composition may be in an amount ranging between any combination of these values, inclusive of the recited values.

The polyol is selected from the group consisting of polyether polyols and polyester polyols. The polyether polyol is a mixture of a first polyether polyol having a functionality of 2 and a hydroxyl number in the range of $\geq 30$ mg KOH/g to $\leq 100$ mg KOH/g and a second polyether polyol having a functionality of 3 and a hydroxyl number in the range of $\geq 200$ mg KOH/g to $\leq 450$ mg KOH/g. Preferably, the poly-ether polyol has a functionality in the range of $\geq 2$ to $\leq 4$ and has a hydroxyl number in the range of $\geq 30$ mg KOH/g to $\leq 900$ mg KOH/g. Preferably, the polyester polyol has a functionality in the range of $\geq 2$ to $\leq 4$ and has a hydroxyl number in the range of $\geq 30$ mg KOH/g to $\leq 2000$ mg KOH/g.

According to the present subject matter, the precursor mixture comprises at least one chain extender. The chain extenders are selected from polyols having molecular weights in the range of $\geq 60$ g/mol to $\leq 200$ g/mol determined according to gel permeation chromatography. Examples of crosslinkers are simple glycols and triols, such as ethylene glycol, propylene glycol, dipropylene glycol, 1,4-butanediol, 1,3-butanediol, tripropylene glycol, diethylene glycol, triethylene glycol, or mixtures thereof.

The isocyanate-reactive component is selected from the group consisting of one or more double metal cyanide ("DMC") catalyzed polyols. The compounds suitable in producing the DMC-catalyzed polyol are any compounds having active hydrogen atoms. Preferred compounds include those compounds having number average molecular weights between 18 to 2,000 Daltons, more preferably, between 32 to 2,000 Daltons, and having from 1 to 8 hydroxyl groups. Any monofunctional or polyfunctional active hydrogen compound may be oxyalkylated for inclusion in the isocyanate-reactive component. Suitable monofunctional initiators include, but are not limited to, methanol, ethanol, propanol, butanol, pentanol, phenols, C6-C36 branched or linear alcohols, and monofunctional ethers of polypropylene glycols, polyethylene glycols, polybutylene glycols, and polyoxyalkylene glycol copolymers. Polyfunctional initiators include, but are not limited to, water, ethylene glycol, propylene glycol, diethylene glycol, dipropylene glycol, triethylene glycol, tripropylene glycol, propanediol, glycerine, trimethylolpropane, butanediol isomers, pentaerythritol, polypropylene glycols, polyethylene glycols, polybutylene glycols, and polyoxyalkylene glycol copolymers. The alkylene oxides useful in producing the DMC-catalyzed polyol contained in the isocyanate-reactive component include, but are not limited to, ethylene oxide, propylene oxide, 1,2- and 2,3-butylene oxide, isobutylene oxide, epichlorohydrin, cyclohexene oxide, styrene oxide, and the higher alkylene oxides such as the C5-C30 $\alpha$-alkylene oxides.

Catalysts are selected from the group consisting of stannous salts of organic carboxylic acids, dialkyltin (IV) salts of carboxylic acids, phenylmercury neodecanoate, bismuth carboxylates, tertiary amines, tertiary amine acid salts, organic metal salts, covalently bound organometallic compounds, and combinations there-of. Preferred tertiary amine catalysts include triethylenediamine, N,N-dimethyl cyclohexylamine, bis-(dimethylamino)-diethyl ether, N-ethyl morpholine, N,N,N',N',N"-pentamethyl diethylenetriamine, N,N-dimethyl aminopropylamine, N-benzyl dime-thylamine, and aliphatic tertiary amine-containing amides of carboxylic acids, such as the amides of N,N-dimethyl aminopropylamine with stearic acid, oleic acid, hydroxystearic acid, and dihydroxylstearic acid. Suitable tertiary amine acid salt catalysts include those prepared by the at least partial neutralization of formic acid, ace-tic acid, 2-ethyl hexanoic acid, oleic acid, or oligomerized oleic acid with a tertiary amine such as triethylenediamine, triethanolamine, triisopropanolamine, N-methyl diethanolamine, N,N-dimethyl ethanolamine, mixtures of these amines, and the like. Preferred organic metal salts for use as catalysts include potassium 2-ethyl hexanoate (potassium "octoate"), potassium oleate, potassium acetate, potassium hydroxide, bismuth octoate, zinc neodecanoate, dibutyltin dilaurate, dibutyltin diacetate, and dibutyltin dioleate, and other organotin carboxylate catalysts.

Catalysts for the present subject matter is selected from other metal based catalysts such as zinc carboxylates, zinc stearate and zinc neodecanoate, and bismuth carboxylates. Other catalysts suitable for use in the present subject matter include amido amine compounds derived from the amidization reaction of N,N-dimethyl propanedimine with fatty carboxylic acids.

The additives are selected from the group consisting of fiber fillers, internal mold release agents, flame retardants, smoke suppressants, dyes, pigments, antistatic agents, antioxidants, UV stabilizers, water scavengers, antifoaming agents, minor amounts of viscosity reducing inert diluents, combinations of these, and any other known additives from the art. Fillers are selected from the group consisting of calcium carbonate, barium sulfate, clays, aluminum trihydrate, antimony oxide, milled glass fibers, wollastonite, talc, mica, flaked glass, silica, titanium dioxide, molecular sieves, micronized polyethylene, moisture scavengers, such as molecular sieves; defoamers, such as polydimethylsiloxanes; and combinations thereof. Fine particulate fillers, such as clays and fine silicas, are often used at thixotropic additives. Such particulate fillers may also serve as extenders to reduce resin usage. Fire retardants are sometimes desirable as additives in pultruded composites. Examples of preferred fire retardant types include, but are not limited to, triaryl phosphates; trialkyl phophates, especially those bearing halogens; melamine (as filler); melamine resins (in minor amounts); halogenated paraffins and combinations thereof.

Additives are not themselves polyfunctional isocyanate reactive materials and are entities separate from the isocyanate-reactive component, even when mixed therewith. Likewise, if the optional additives, or any part thereof, are premixed with the polyisocyanate component, these are entities separate from the polyisocyanate component, except in the case where they are themselves polyfunctional isocyanate species.

The stoichiometry the precursor mixture containing at least one di- or polyisocyanate and at least one polyol is often expressed by a quantity known in the art as the isocyanate index. The index of such a mixing activated precursor mixtures is simply the ratio of the total number of reactive isocyanate (—NCO) groups present to the total number of isocyanate-reactive groups (that can react with the isocyanate under the conditions employed in the process, such as hydroxyl groups). This quantity is often multiplied by 100 and expressed as a percent. Preferred isocyanate index values in the precursor mixtures, which are suitable for use in the invention range from 70 to 150%. A more preferred range of index values is from 90 to 125%.

In the context of the present invention, the at least one di- or polyisocyanate and at least one polyol are preferably homogeneously miscible, in particular at a temperature from 10 to 70° C. Homogeneous miscibility is determined by that no phase separation is visible after thoroughly mixing the components. The homogeneity of the precursor mixture improves the homogeneity of the fiber coating during impregnation, also at higher processing speeds.

According to a further preferred embodiment of the invention, the precursor mixture has a viscosity at 25° C. of 700 mPas or less after mixing the at least one die- or polyisocyanate and at least one polyol for 30 seconds, in particular a viscosity of 600 mPas or less.

The sizing composition further comprises one or more surfactants, solvents, film-forming agents, lubricants and wetting agents. The sizing composition further comprises water to dissolve or disperse the active solids onto the reinforcing fibers. Water can be added in an amount sufficient to dilute the aqueous sizing com-position to a viscosity that is suitable to achieve the desired solid contents on the fibers. The sizing composition further comprises optionally rheology modifiers, fillers, coalescents, antistatic agents, dyes, oils, thermal stabilizers, anti-foaming agents, antioxidants, biocides and pH modifiers.

The sizing composition comprises ≥1 wt. % to ≤99 wt. % of the at least one sizing agent and ≥0.1 wt. % to ≤5 wt. % of at least one surfactant. The surfactant is selected from the group consisting of a block copolymers based on ethylene oxide and propylene oxide, stearic ethanolamide, polyethylene glycol esters, ethoxylated castor oil esters, aliphatic monoamines, aromatic diamines, amine ethoxylates and cationic fatty amides. The block copolymer based on ethylene oxide and propylene oxide is selected from the group consisting of ethylenediamine polyoxyethylene-polyoxypropylene block copolymer, ethoxylated alcohols.

The film-forming agent creates an improved adhesion between the rein-forcing fibers, which results in improved strand integrity. The film-forming agent acts as a polymeric-binding agent to provide additional protection to the reinforcing fibers and improve processability. The film-forming agent may be any suitable polymer that can be dispersed or dissolved into an aqueous medium and which will coalesce to form a film when the sizing composition is dried. The film-forming agent is selected from the group consisting of polyvinyl amine, polyvinyl amine copolymers, polyamides, polyacrylamides, polyacrylamide copolymers and combinations thereof.

The lubricant protects the surface of the fibers essential to maximize the strength of the fibers, from scratches caused by fiber-to-fiber rubbing abrasion and from processing equipment. The lubricant is selected from the group consisting of alkoxylated fatty acid ester, such as for example decyl laurate, isopropyl palmitate, isopropyl stearate, alkoxylated fatty alcohol, such as for example polyethylene glycol laurate or stearate, fatty amine salts and mixtures thereof.

In an embodiment of the subject matter, the plurality of reinforcing fibers contacted with the sizing composition can be sized. In another embodiment, the plurality of reinforcing fibers contacted with the sizing composition can be unsized.

The weight percentage of the fiber reinforced in the pultruded composite prepared by the pultrusion process (P) of the present subject matter can vary considerably and depends on the end use application intended of the composite material. Reinforcement loadings can be from 30 wt. % to 95 wt. %, preferably from 40 wt. % to 90 wt. % of the final composite, more preferably from 60 wt. % to 90 wt. %, and most preferably from 70 wt. % to 90 wt. %, based on the weight of the final composite. The fiber reinforcement can be present in the pultruded composite in an amount ranging between any combination of these values, inclusive of the recited values.

The sized reinforcing fibers of the pultrusion process can be coated in combination with a plane reinforcing fibers. The sized reinforcing fibers can be used in combination with the plane reinforcing fibers preferably in a weight ratio of ≥35 to ≤80.

As those skilled in the art are aware, pultrusion of polyurethane systems with fiber reinforced composites is performed by supplying the at least one di- or polyisocyanate and at least one polyol to a mix/metering machine for delivery in a desired ratio to a mixing apparatus, preferably a static mixer, to produce a precursor mixture. The precursor mixture is supplied to an injection die where it can be used to impregnate fibers being pulled concurrently into the injection die. The resulting uncured plurality of coated sized reinforcing fibers is pulled through a zoned heating die, attached directly to the injection die, having a desired cross-section where it is shaped and cured.

The plurality of the coated sized reinforcing fibers obtained are passed through at least one die and at least one heating zone to obtain the reinforced thermoset polyurethane composite. The steps of the pultrusion process (P) according to the present subject matter are performed uninterrupted continuously.

The heating zone of the pultrusion process (P) comprises heating zones (Z1), (Z2) and (Z3). The heating zone (Z1) has a temperature in the range of ≥135° C. to ≤180° C., the heating zone (Z2) has a temperature in the range of ≥150° C. to ≤180° C. and the heating zone (Z3) has a temperature in the range of ≥180° C. to ≤210° C.

The reinforced thermoset polyurethane composite is drawn from the heating zones. The reinforced composite can be further cut into segments to form a reinforced composite prepag adapted for use in an injection moulding or extrusion.

The pultrusion apparatus preferably has at least one impregnation die and at least one curing die. Because no polymerization is to take place in the impregnation die, the curing die necessarily will operate at a higher temperature than the impregnation die. The pultrusion apparatus may optionally contain a plurality of curing dies, or zones. Different curing zones may be set at different temperatures, if desired, but all the zones of the curing die will be higher in temperature than the impregnation die. Preferably, there is just one impregnation die, and this preferably is situated immediately prior to the first curing die (or zone). The impregnation die is set at a temperature that provides for substantially no reaction between the polyisocyanate component and the polyisocyanate-reactive component in the immiscible polyurethane composition before the reinforcing fiber which has been at least partially impregnated with immiscible polyurethane composition, enters the first curing die.

According to a preferred embodiment of the present subject matter, the precursor mixture comprises
a) ≥37 wt. % to ≤60 wt. % of at least one di- or polyisocyanate,
b) ≥10 wt. % to ≤30 wt. % of at least one polyol,
c) ≥0.1 wt. % to ≤2.0 wt. % of at least one catalyst, and
d) ≥1 wt. % to ≤9 wt. % of at least one additive, and based on the total weight of the precursor mixture.

According to another preferred embodiment of the present subject matter, the precursor mixture comprises
a) ≥40 wt. % to ≤60 wt. % of at least one di- or polyisocyanate,
b) ≥10 wt. % to ≤30 wt. % of at least one polyol,
c) ≥0.1 wt. % to ≤1.0 wt. % of at least one catalyst, and
d) ≥1 wt. % to ≤9 wt. % of at least one additive, and based on the total weight of the precursor mixture.

According to another preferred embodiment of the present subject matter, the precursor mixture comprises
e) ≥40 wt. % to ≤60 wt. % of at least one di- or polyisocyanate,
f) ≥10 wt. % to ≤30 wt. % of at least one polyol,
g) ≥0.1 wt. % to ≤1.0 wt. % of at least one catalyst, and
h) ≥1 wt. % to ≤9 wt. % of at least one additive, and based on the total weight of the precursor mixture.

The term "strands" used in the present subject matter means the base strands resulting from the gathering together under the bushing of a multitude of filaments, and the products derives from these strands, and, the assemblies of these strands in the form of rovings. Rovings can be either direct rovings or multi-end rovings. Direct rovings are obtained by gathering together filaments directly under the bushing and winding them onto a rotating support. Multi-end rovings are obtained by a two-step process, first by gathering together filaments and splitting them to several bundles and wrapping them into cylindrical packages, rovings are then obtained by assembling the packages together.

The reinforcing fibers of the present subject matter are used as reinforcement for thermosetting polyurethane composite. According to the pultrusion process (P) of the present subject matter, the polyimine in the sizing composition is chemically reactive, and interferes with the polyurethane formation at the surface of the fiber, thus changing the physical properties of the pultruded piece. The rein-forced thermoset polyurethane composite prepared according to the pultrusion process (P) of the present subject matter therefore shows an improved impact resistance, dimensional stability, improved mechanical properties such as improved strength, stiffness, yield stress, break stress, strain at flex strength.

The pultrusion process (P) according to the present subject matter has the following advantages:

i. The process enables to control the mechanical performance of the compo-site, for example to enhance or to reduce the bonding strength, provide more elongation or make it more brittle material,
ii. The process eliminates costly inventory and part number management of the re-sized fibers.
iii. The process eliminates the need to place source fibers of different surface treatment into specific physical locations, which could be a potential source for operator error and could greatly effect performance of the final composite,
iv. The process reduces the potential of contamination due to sources such as humidity, dust or other foreign agents which could take place in storage or even while mounted on the creel,
v. The process creates new arrays of applications with emphasis on increased mechanical properties that would allow a manufacturer to design new pultrusion profile by adding localized treated fibers that need to improve energy absorption, large deflection, or higher strength stress.

Without further elaboration, it is believed that using the preceding description that one skilled in the art can utilize the present subject matter to its fullest extent and easily ascertain the essential characteristics of this subject matter, without departing from the spirit and scope thereof, to make various changes and modifications of the subject matter and to adapt it to various usages and conditions. The preceding embodiments are, therefore, to be construed as merely illustrative, and not limiting the remainder of the disclosure in any way whatsoever, and that it is in-tended to cover various modifications and equivalent arrangements included within the scope of the subject matter.

EXAMPLES

The presently claimed invention is illustrated in detail by the working examples which follow. More particularly, the test methods specified hereinafter are part of the general disclosure of the application and are not restricted to the specific working examples.

Preparation of the Reinforced Composite and Evaluation of Properties

Two series of experiments were conducted, a plaque test and a field trial. The results of the plaque trial were used as a screening tool for the field trial. In this plaque test, 12×12 in. glass fiber mats were cut, and then treated with a 1 wt. % solution containing polyvinyl pyrrolidone (Sokalan K30, BASF) and a polyethelyeneimine (Lupasol PN 40, BASF). The weight average molecular weight of the sizing agent, polyvinyl pyrrolidone is 45,000 g/mol and the weight average molecular weight of polyethelyeneimine is in the range of 800 g/mol to 2,000,000 g/mol determined according to gel permeation chromatography. The treated glass fiber mats were dried in an oven (50° C.) overnight and then brought to a plaque machine. A polyurethane formulation was added to the mat after drying, and then heated and pressure was applied. The formed plaque tested for measurement of tensile peak and elongation and ash content as shown in Table 1.

The polyurethane formulation used is a two components system (Isocyanate and Resin). The isocyanate side consists of Carbodiimide Modified MDI (4,4'- and 2,4'-isomers of diphenylmethane diisocyanate). The carbodiimide-modified isocyanates are liquids that are stable and clear at room temperature. A portion of the MDI was reacted to yield a carbodiimide-modified isocyanate with a free-NCO weight between 29.2% and 29.5%. The carbodiimide-modification led to the formation of a 3-functional uretonimine species within the remaining difunctional MDI. The resin side consists of polyether polyols and multiple additives. The polyether polyols used were difunctional and trifunctional with hydroxyl group number ranging from 50 to 400. The polyether polyols used have weight average molecular weight in the range of 500 g/mol to 2500 g/mol determined according to gel permeation chromatography. The polyols have a water content below 0.05% and a sodium and potassium content in the range of 10 ppm or below. The Resin side can be mixed with Isocyanate side at different ratio to get desired hardness of the cured parts and products.

The field trial was conducted using polyetheneimines (Lupasol®) as the sizing agent. The products were made into a solution, and then coated prior to the injection box of the pultrusion line. After being dipped in the water based solution, the fibers were dried using heated convection. The samples then were pultruded as normal. The results of these field trial pieces are shown in Table 1.

Results

TABLE 1

Plaque test

| Test | Component | Unit | Experiment No. | Water | Lupasol PN40 | Sokalan K30 |
|---|---|---|---|---|---|---|
| Ash | % Ash | Percentage (%) | 1 | 66.500 | 47.920 | 68.650 |
| | | | 2 | 67.210 | 49.480 | 65.870 |
| | | | 3 | 68.170 | 50.250 | 67.160 |
| | | | % Ash Average | 67.293 | 49.217 | 49.217 |
| Tensile Peak and Elongation | Break Elongation | Percentage (%) | 1 | 3.800 | 4.000 | 2.700 |
| | | | 2 | 3.800 | 3.800 | 2.800 |
| | | | 3 | 3.000 | 3.800 | 2.100 |
| | | | Break Elongation Average | 3.533 | 3.867 | 2.533 |
| | Peak Stress | psi | 1 | 31086.230 | 20789.200 | 22331.200 |
| | | | 2 | 61708.630 | 20146.820 | 22001.710 |
| | | | 3 | 25655.070 | 20016.220 | 16078.940 |
| | | | Peak Stress Average | 39483.310 | 20317.413 | 20137.283 |

Test Methods
Polymer Molecular Weight Determination

To determine polymer molecular weights by gel permeation chromatography (GPC), fully dissolved molecules of a polymer sample were fractionated on a porous column stationary phase. Tetrahydrofuran (THF) was used as the eluent solvent. The molecular weight distribution, the number average molecular weight Mn and the mass average molecular weight Mw and the polydispersity Mw/Mn of the polymer samples were calculated with the aid of chromatography software utilizing a calibration curve generated with the EasyValid validation kit which includes a series of unbranched-polystyrene standards of varied molecular weights available from Polymer Standards Service.

Tensile Strength Determination

The tensile strength was determined in accordance with the Standard Test Method ASTM3039.

Flexural Strength Determination

The flexural properties of unreinforced and reinforced plastics were determined in accordance with the Standard Test Method ASTM D790.

The invention claimed is:

1. A pultrusion process for preparing a reinforced thermoset polyurethane composite, the process comprising the steps of:
    a) contacting a plurality of reinforcing fibers with a sizing composition comprising at least one sizing agent selected from at least one polyimine having a weight average molecular weight in a range of ≥800 g/mol to ≤1,000,000 g/mol determined according to gel permeation chromatography, to obtain a plurality of sized reinforcing fibers;
    b) coating the plurality of sized reinforcing fibers obtained in step a) with a precursor mixture comprising (i) at least one di- or polyisocyanate and (ii) at least one polyol to obtain a plurality of coated sized reinforcing fibers; and
    c) passing the plurality of coated sized reinforcing fibers obtained in step b) through at least one die and at least one heating zone to obtain the reinforced thermoset polyurethane composite.

2. The pultrusion process according to claim 1, wherein the plurality of reinforcing fibers is selected from the group consisting of glass fibers, ceramic fibers, metal fibers, carbon fibers, natural fibers, polyester fibers, polyaramid fibers, basalt fibers and nylon fibers.

3. The pultrusion process according to claim 1, wherein the sizing composition further comprises surfactants, solvents, film-forming agents, lubricants and wetting agents.

4. The pultrusion process according to claim 1, wherein steps a), b) and c) are performed uninterrupted continuously.

5. The pultrusion process according to claim 1, wherein the sizing composition comprises ≥1 wt. % to ≤99 wt. % of the at least one sizing agent and ≥0.1 wt. % to ≤5 wt. % of at least one surfactant.

6. The pultrusion process according to claim 5, wherein the at least one polyimine is a poly-alkylene imine.

7. The pultrusion process according to claim 6, wherein the polyalkylene imine has a weight average molecular weight in a range of ≥800 to ≤900,000 g/mol determined according to gel permeation chromatography, and is selected from the group consisting of polyethylene imine and modified polyethylene imine.

8. The pultrusion process according to claim 5, wherein the at least one surfactant is selected from the group consisting of block copolymer based on ethylene oxide and propylene oxide, stearic ethanolamide, polyethylene glycol esters, ethoxylated castor oil esters, aliphatic monoamines, aromatic diamines, amine ethoxylates and cationic fatty amides.

9. The pultrusion process according to claim 8, wherein the block copolymer based on ethylene oxide and propylene oxide is selected from the group consisting of ethylenediamine polyoxyethylene-polyoxypropylene block co-polymer and ethoxylated alcohols.

10. The pultrusion process according to claim 1, wherein the plurality of reinforcing fibers is contacted with ≥0.01 wt. % to ≤50 wt. % of the sizing composition, based on a total weight of the plurality of sized reinforcing fibers.

11. The pultrusion process according to claim 1, further comprising the step of drying of the plurality of sized reinforcing fibers by heating the plurality of sized reinforcing fibers obtained in step a) at a temperature in a range of ≥35° C. to ≤200° C.

12. The pultrusion process according to claim 1, wherein the precursor mixture further comprises (iii) at least one catalyst, and (iv) at least one additive.

13. The pultrusion process according to claim 1, wherein the reinforced thermoset polyurethane composite is a reaction product of the at least one polyol and the at least one di- or polyisocyanate.

14. The pultrusion process according to claim 1, wherein the at least one polyol is selected from the group consisting of polyether polyols and polyester polyols.

15. The pultrusion process according to claim 14, wherein the polyether polyol has a functionality in a range of ≥2 to ≤4.

16. The pultrusion process according to claim 14, wherein the polyether polyol has a hydroxyl number in a range of ≥30 mg KOH/g to ≤900 mg KOH/g.

17. The pultrusion process according to claim 14, wherein the polyether polyol is a mixture of a first polyether polyol having a functionality of 2 and a hydroxyl number in a range of ≥30 mg KOH/g to ≤100 mg KOH/g and a second polyether polyol having a functionality of 3 and a hydroxyl number in a range of ≥200 mg KOH/g to ≤450 mg KOH/g.

18. The pultrusion process according to claim 14, wherein the polyester polyol has a functionality in a range of ≥2 to ≤4.

19. The pultrusion process according to claim 14, wherein the polyester polyol has a hydroxyl number in a range of ≥30 mg KOH/g to ≤2000 mg KOH/g.

20. The pultrusion process according to claim 12, wherein the precursor mixture comprises
   (a) ≥37 wt. % to ≤60 wt. % of the at least one di- or polyisocyanate,
   (b) ≥10 wt. % to ≤30 wt. % of the at least one polyol,
   (c) ≥0.1 wt. % to ≤1 wt. % of the at least one catalyst, and
   (d) ≥1 wt. % to ≤9 wt. % of the at least one additive based on a total weight of the precursor mixture.

21. The pultrusion process according to claim 1, wherein the at least one di- or polyisocyanate is selected from the group consisting of ethylene diisocyanate, 1,4-tetramethylene diisocyanate, 1,6-hexamethylene diisocyanate, 1,12-dodecane diisocyanate, cyclobutane-1,3-diisocyanate, cyclohex-ane-1,3- and -1,4-diisocyanate, 1-isocyanato-3,3,5-trimethyl-5-isocyanatomethyl-cyclohexane, 2,4- and 2,6-hexahydrotoluene diisocyanate, dicyclohexylmethane-4,4'-diisocyanate, 1,3- and 1,4-phenylene diisocyanate, 2,4- and 2,6-toluene diisocyanate, diphenylmethane-2,4'- and/or -4,4,'-diisocyanate, naphthyl ene-1,5-diisocyanate, triphenyl-methane-4,4',4''-triisocyanate, polyphenyl-polymethylene-polyisocyanates, norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret-containing polyisocyanates and isocyanate-terminated prepolymers.

22. The pultrusion process according to claim 12, wherein the at least one additive is selected from the group consisting of internal mold release agents, flame retardants, smoke suppressants, fillers, dyes, pigments, antistatic agents, antioxidants, water scavengers, antifoaming agents and UV stabilizers.

23. The pultrusion process according to claim 12, wherein the at least one catalyst is selected from the group consisting of stannous salts of organic carboxylic acids, dialkyltin (IV) salts of carboxylic acids, phenylmercury neodecano-ate, bismuth carboxylates, and tertiary amines.

24. The pultrusion process according to claim 1, wherein in step b) the sized reinforcing fibers are coated in combination with a plane reinforcing fiber.

25. The pultrusion process according to claim 24, wherein in step b) the sized reinforcing fibers are used in combination with the plane reinforcing fiber in a weight ratio of ≥35 to ≤80.

26. The pultrusion process according to claim 1, wherein in the step b) the sized reinforcing fibers are reacted with the precursor mixture at a surface of the plurality of sized reinforcing fibers.

27. The pultrusion process according to claim 1, wherein the at least one heating zone comprises heating zones (Z1), (Z2) and (Z3).

28. The pultrusion process according to claim 27, wherein the heating zone (Z1) has a temperature in a range of ≥135° C. to ≤180° C., the heating zone (Z2) has a temperature in a range of ≥150° C. to ≤180° C. and the heating zone (Z3) has a temperature in a range of ≥180° C. to ≤210° C.

* * * * *